United States Patent
Solheim

(10) Patent No.: US 9,771,920 B2
(45) Date of Patent: Sep. 26, 2017

(54) WAVE ENERGY CONVERTER

(71) Applicant: Havkraft AS, Deknepollen (NO)

(72) Inventor: Geir Arne Solheim, Deknepollen (NO)

(73) Assignee: Havkraft AS, Deknepollen (NO)

( * ) Notice: Subject to any disclaimer, the term of this patent is extended or adjusted under 35 U.S.C. 154(b) by 22 days.

(21) Appl. No.: 14/419,630

(22) PCT Filed: Jul. 31, 2013

(86) PCT No.: PCT/EP2013/002266
§ 371 (c)(1),
(2) Date: Feb. 4, 2015

(87) PCT Pub. No.: WO2014/023401
PCT Pub. Date: Feb. 13, 2014

(65) Prior Publication Data
US 2015/0219066 A1 Aug. 6, 2015

(30) Foreign Application Priority Data

Aug. 4, 2012 (GB) .................................. 1213884.8
Aug. 4, 2012 (NO) .................................. 20120871

(51) Int. Cl.
*F03B 13/14* (2006.01)
*F03B 13/24* (2006.01)
*E02B 9/08* (2006.01)

(52) U.S. Cl.
CPC .............. *F03B 13/142* (2013.01); *E02B 9/08* (2013.01); *F03B 13/24* (2013.01);
(Continued)

(58) Field of Classification Search
CPC ........... Y02E 10/38; Y02E 10/28; F03B 13/20
(Continued)

(56) References Cited

U.S. PATENT DOCUMENTS 960,478 A * 6/1910 Allard .................... F03B 13/24
417/100
1,003,635 A * 9/1911 Melander .............. F03B 13/144
415/151
(Continued)

FOREIGN PATENT DOCUMENTS

FR    2959780 A1    11/2011
GB    2030232 A     4/1980
(Continued)

OTHER PUBLICATIONS

Search Report received for United Kingdom Patent Application No. GB1213884.8, dated Nov. 19, 2012, 3 pages.
(Continued)

*Primary Examiner* — Tulsidas C Patel
*Assistant Examiner* — Charles Reid, Jr.
(74) *Attorney, Agent, or Firm* — Ziegler IP Law Group, LLC

(57) ABSTRACT

A wave energy converter to convert energy conveyed in ocean waves propagating in a wave propagation direction in an ocean environment and received at the converter into generated power includes a plurality of columns which are in fluidic communication via corresponding ports to the ocean waves received at the converter. The ports are arranged substantially in series along the wave propagation direction, and the ports are of progressively greater depth into the ocean environment along the wave propagation direction to cause the ocean waves to propagate in a downwardly-directed manner when received at the ports. The plurality of columns are arranged so that that their elongate axes are substantially aligned along a first direction, and that the ports have corresponding port angles relative to the first direction which are progressively larger as the ports (50) are of progressively greater depth.

8 Claims, 14 Drawing Sheets

(52) U.S. Cl.
CPC ........... *F05B 2240/40* (2013.01); *Y02E 10/32* (2013.01); *Y02E 10/38* (2013.01)

(58) Field of Classification Search
USPC .......................................................... 290/53
See application file for complete search history.

(56) References Cited

U.S. PATENT DOCUMENTS

| | | | | |
|---|---|---|---|---|
| 4,022,549 | A | * 5/1977 | Gregg | ..................... F03B 13/24 |
| | | | | 417/100 |
| 4,123,185 | A | * 10/1978 | Hagen | ..................... E02B 3/062 |
| | | | | 114/258 |
| 4,466,244 | A | 8/1984 | Wu | |
| 5,461,862 | A | * 10/1995 | Ovadia | ................. F03B 13/142 |
| | | | | 60/502 |
| 2010/0150718 | A1* | 6/2010 | Freda | ..................... F03D 13/20 |
| | | | | 416/120 |
| 2010/0237623 | A1 | 9/2010 | Brown et al. | |
| 2013/0088190 | A1* | 4/2013 | Kang | ................. B01F 7/00916 |
| | | | | 320/107 |
| 2013/0099502 | A1* | 4/2013 | Roberts | ................... F03B 13/08 |
| | | | | 290/54 |

FOREIGN PATENT DOCUMENTS

| | | |
|---|---|---|
| GB | 2504682 B | 10/2014 |
| JP | 2001172932 A | 6/2001 |
| NO | 20110487 A1 | 12/2011 |
| NO | 3347698 B1 | 5/2014 |
| WO | 2007037401 A1 | 4/2007 |
| WO | 2014023401 A2 | 2/2014 |
| WO | 2014023401 A3 | 4/2014 |

OTHER PUBLICATIONS

Examination Report received for United Kingdom Patent Application No. GB1213884.8, dated Feb. 4, 2013, 2 pages.

Search Report received for Norwegian Patent Application No. 20110487, dated Feb. 4, 2013, 4 pages including 2 pages of machine translation.

* cited by examiner

WAVE ENERGY CONVERTER

FIELD OF THE INVENTION

The present invention relates to wave energy converters, for example to wave energy converters for generating renewable energy or for absorbing wave energy for providing protection against ocean waves, for example for providing protection for floating structures and/or for reducing coastal erosion. Moreover, the present invention concerns methods of generating renewable energy using aforementioned wave energy converters. Furthermore, the present invention concerns methods of absorbing wave energy using aforementioned wave energy converters, for example for providing protection for floating structures and/or for reducing coastal erosion. Additionally, the present invention concerns component parts for constructing aforementioned wave energy converters. Additionally, the present invention concerns systems for generating power from ocean waves, wherein the systems include a plurality of aforesaid wave energy converters. Yet additionally, the present invention concerns systems for absorbing wave energy for providing protection against ocean waves, wherein the systems include a plurality of aforesaid wave energy converters.

BACKGROUND OF THE INVENTION

Wave energy converters are known in the art and employ a variety of wave energy conversion mechanisms. However, unlike offshore wind turbines, ocean wave energy converters have not hitherto been deployed in large numbers for providing electrical power to electrical supply networks. A contemporary challenge is to implement aforesaid ocean wave energy converters in a cost effective manner, whilst ensuring that they convert ocean wave energy efficiently to electrical power and also survive severe weather conditions which are occasionally encountered offshore. The challenge thus has associated constraints which can be mutually opposing, for example a robust design of ocean wave converter is potentially more costly to manufacture and deploy in comparison to a less-robust structure.

A robust and efficient wave energy converter is described in a published international PCT patent application no. WO2011/162615A2 (PCT/NO2011/000175, "Ocean Wave Energy System", Havkraft AS, Geir Solheim) which is hereby incorporated by reference. The wave energy converter is implemented as an ocean wave energy system for generating power from ocean waves, wherein the system includes a platform supporting an array of hollow columns whose respective lower ends are in fluidic communication with ocean waves and whose respective upper ends are in air communication with a turbine arrangement such that wave motion occurring at the lower ends is operable to cause air movement within the columns for propelling the turbine arrangement to generate power output. The system further includes one or more position-adjustable and/or angle-adjustable submerged structures near the lower ends of the columns for forming ocean wave propagating in operation towards the lower ends of the columns to couple the waves in a controllable manner into the hollow columns.

In the aforesaid published PCT application no. WO2011/162615A2, there is provided a comprehensive overview of wave energy theory which is hereby incorporated by reference. Ocean waves are surface waves substantially at an interface between two fluids, namely ocean water and air. The surface waves propagate substantially within a plane of the interface and are susceptible to being refracted, reflected, transmitted and absorbed at any objects intersecting substantially with the plane of the interface. For the surface waves to be absorbed effectively, the objects must be wave impedance matched to an impedance of the surface waves. When the objects are of a physical size comparable to a wavelength of the surface waves, designing the objects to provide an effective wave impedance match is a complex task, especially when the surface waves in practice have a varying wavelength depending upon ocean weather conditions. In addition, the objects need to be designed to withstand severe storm conditions and also be substantially free of cavitation effects when large amounts of wave energy are being absorbed by the objects. The aforesaid published PCT application describes a wave energy converter which is capable of providing efficient absorption of ocean waves. Although there are many similarities between electromagnetic wave propagation and ocean wave propagation, there are major differences on account of ocean waves having mass and being subject to fluid flow effects.

However, there arises a need to implement a wave energy converter which is especially efficient at absorbing ocean wave energy whilst also being robust in operation, and cost effective to manufacture. For example, it is desirable that the wave energy converter is manufactured in such a manner which is convenient for contemporary ship yards.

SUMMARY OF THE INVENTION

The present invention seeks to provide an improved wave energy converter which is more efficient in operation, more robust and more efficient in its use of construction materials.

According to a first aspect of the present invention, there is provided a wave energy converter defined in appended claim 1: there is provided a wave energy converter for converting in operation energy conveyed in ocean waves propagating in a wave propagation direction in an ocean environment and received at the converter into generated power, characterized in that the converter includes a plurality of columns which are in fluidic communication via corresponding ports to the ocean waves received at the converter, wherein the ports are arranged substantially in series along the wave propagation direction, and wherein the ports are of progressively greater depth into the ocean environment along the wave propagation direction so as to cause a first component of the ocean waves to propagate in a downward direction and a second component of the ocean waves to propagate into the ports to coupled energy thereto.

The invention is of advantage in that the disposition of the plurality of ports to create a downwardly-directly vortex provides for more efficient wave energy adsorption.

Optionally, in the wave energy converter, the plurality of columns are arranged so that that their elongate axes are substantially aligned along a first direction, and that the ports have corresponding port angels ($\theta$) relative to the first direction which are progressively larger as the ports are of progressively greater depth. More optionally, in the wave energy converter, the first direction is substantially a vertical direction when the converter is in operation.

Optionally, in the wave energy converter, the plurality of columns are arranged so that that their elongate axes are substantially aligned along a first direction, and that the ports have corresponding port angels ($\theta$) relative to the first direction which are progressively smaller as the ports are of progressively greater depth.

Optionally, in the wave energy converter, the ports have an elliptical, round or rectilinear cross-section.

Optionally, in the wave energy converter, the plurality of columns are operable to couple to the ocean waves received at the ports in a resonant manner.

Optionally, in the wave energy converter, the columns include corresponding energy pickoff devices at upper regions thereof and/or at lower regions thereof and/or in ports thereof. More optionally, the energy pickoff devices are coupled to a common turbine facility; alternatively, each energy pickoff device functions as an autonomous energy extraction element, for example as a Wells-type turbine mounted at an upper portion of each column.

Optionally, each converter includes in a range of 2 to 10 columns and associated ports arranged in series. More optionally, each converter includes in a range of 3 to 8 columns.

Optionally, the wave energy converter includes one of more submerged wave reflectors in a vicinity of the ports of the converter for reflecting the ocean waves more efficiently into the ports. More optionally, the wave energy converter includes a mechanism for adjusting a spatial position of the one or more submerged wave reflectors relative to the ports for tuning the converter for more optimally converting energy present in the ocean waves.

According to a second aspect of the invention, there is provided a wave energy system including a platform defining a peripheral edge thereto, characterized in that a plurality of wave energy converters pursuant to the first aspect of the invention are mounted substantially around at least a portion of the peripheral edge to receive ocean waves propagating towards the system at the converters.

Optionally, in the wave energy system, the platform is provided with one or more peripheral lobes around which the plurality of wave energy converters are disposed.

Optionally, the wave energy system is implemented such that the platform has a triangular, round or polygonal form.

Optionally, the wave energy system is implemented such that the platform comprises a plurality of polygonal modules which are mutually coupled together to form the platform. More optionally, the wave energy system is implemented such that the plurality of polygonal modules are of mutually similar form.

Optionally, the wave energy system is implemented such that the platform is arranged to support a Thorium nuclear reactor apparatus, and that the plurality of wave energy converters are operable to protect the Thorium nuclear reactor apparatus from damage from ocean waves.

Optionally, the wave energy system is implemented such that the platform is operable to support one or more buildings. More optionally, the one or more buildings are for one or more of: floating hospitals, residential facilities, hotels, prisons, offshore manufacturing, offshore servicing for oil and gas discovery and production systems, for electrical power distribution offshore.

According to a third aspect of the invention, there is provided a method of converting energy conveyed in ocean waves propagating in a wave propagation direction in an ocean environment when received at a wave energy converter to generate power, characterized in that the method includes:

(a) arranging for the converter to include a plurality of columns which are in fluidic communication via corresponding ports to the ocean waves received at the converter;

(b) arranging for the ports to be arranged substantially in series along the wave propagation direction, and (c) arranging for the ports to be of progressively greater depth into the ocean environment along the wave propagation direction so as to cause a first component of the ocean waves to propagate in a downward direction and a second component of the ocean waves to propagate into the ports to coupled energy thereto.

Optionally, the method includes arranging the plurality of columns so that that their elongate axes are substantially aligned along a first direction, and that the ports have corresponding port angels (θ) relative to the first direction which are progressively larger as the ports are of progressively greater depth.

Optionally, the method includes arranging the plurality of columns so that that their elongate axes are substantially aligned along a first direction, and that the ports have corresponding port angels (θ) relative to the first direction which are progressively smaller as the ports are of progressively greater depth.

It will be appreciated that features of the invention are susceptible to being combined in various combinations without departing from the scope of the invention as defined by the appended claims.

DESCRIPTION OF THE DIAGRAMS

Embodiments of the present invention will now be described, by way of example only, with reference to the following diagrams wherein.

Figure 4:
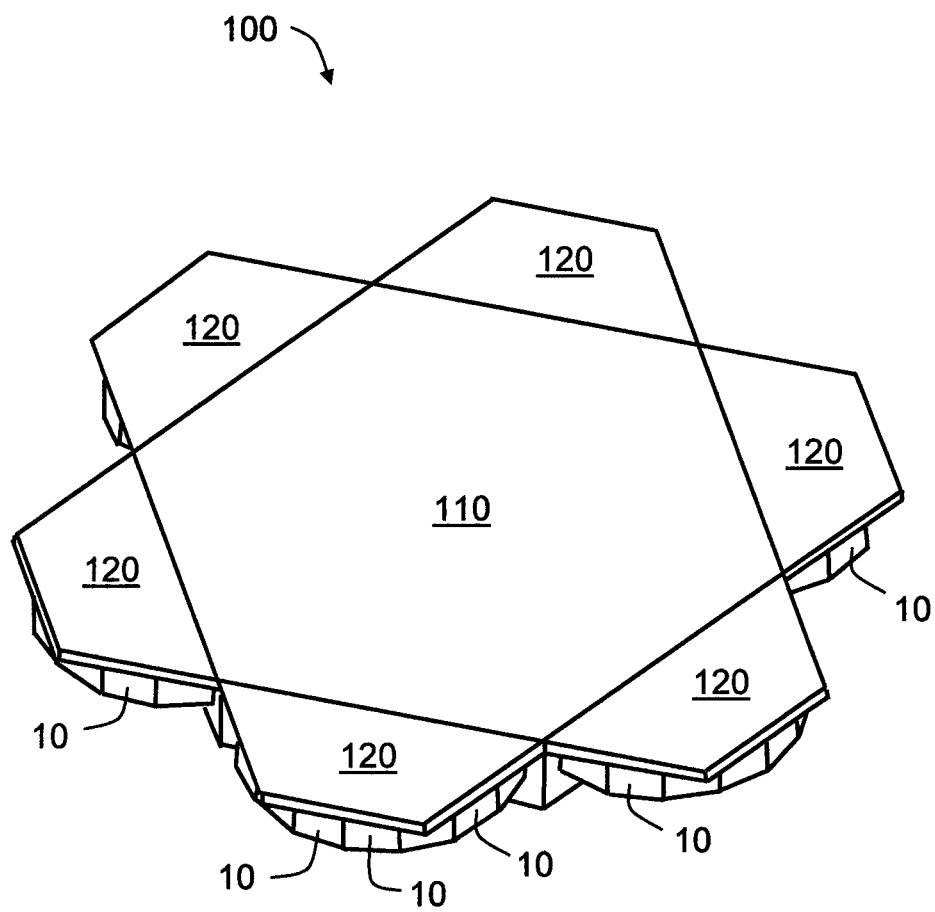
FIG. 4 is an illustration of an ocean wave energy system including a peripheral arrangement of wave energy converters pursuant to at least one of FIG. 1 to FIG. 3B.
Figure 12:
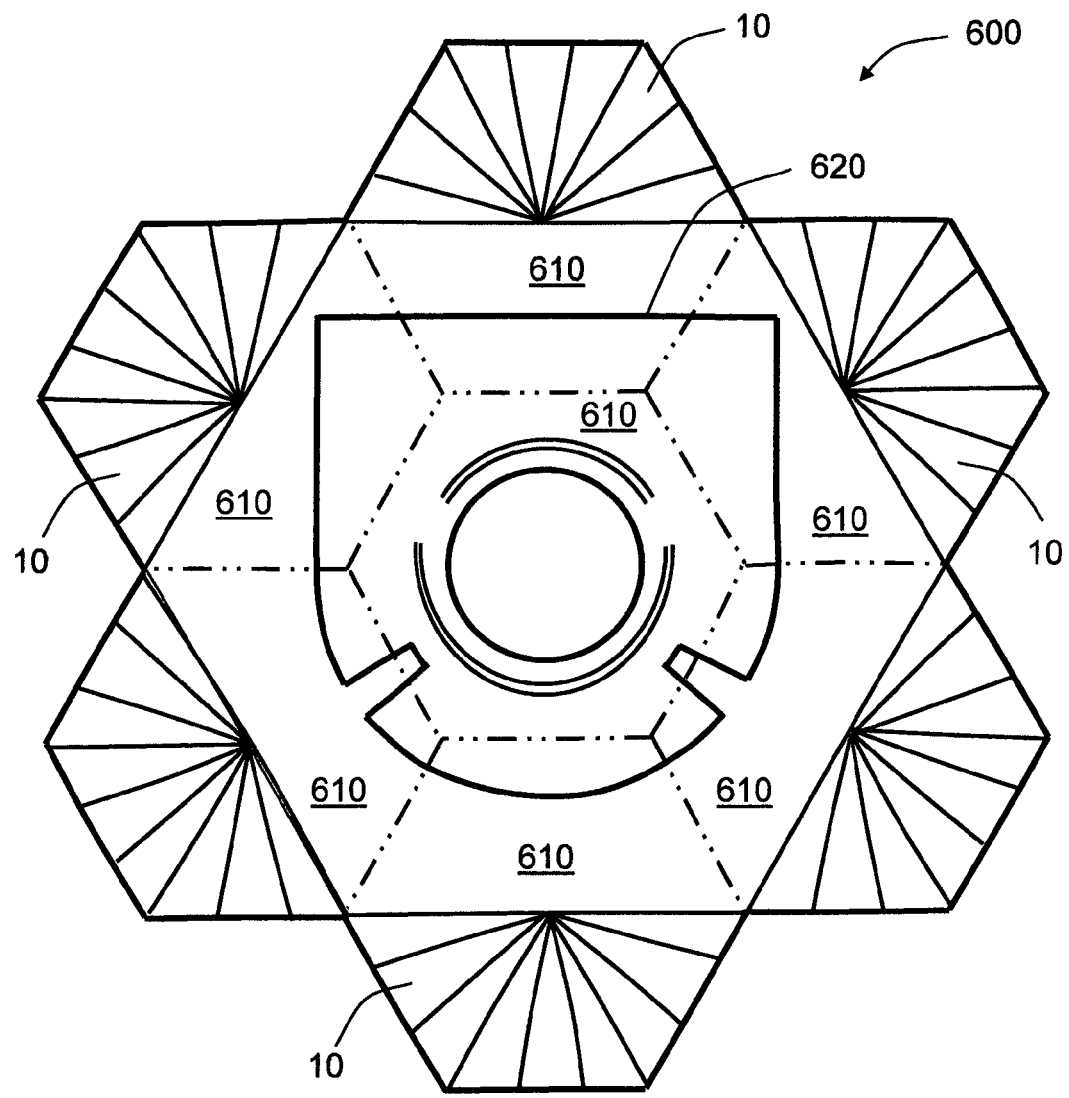
Figure 13:
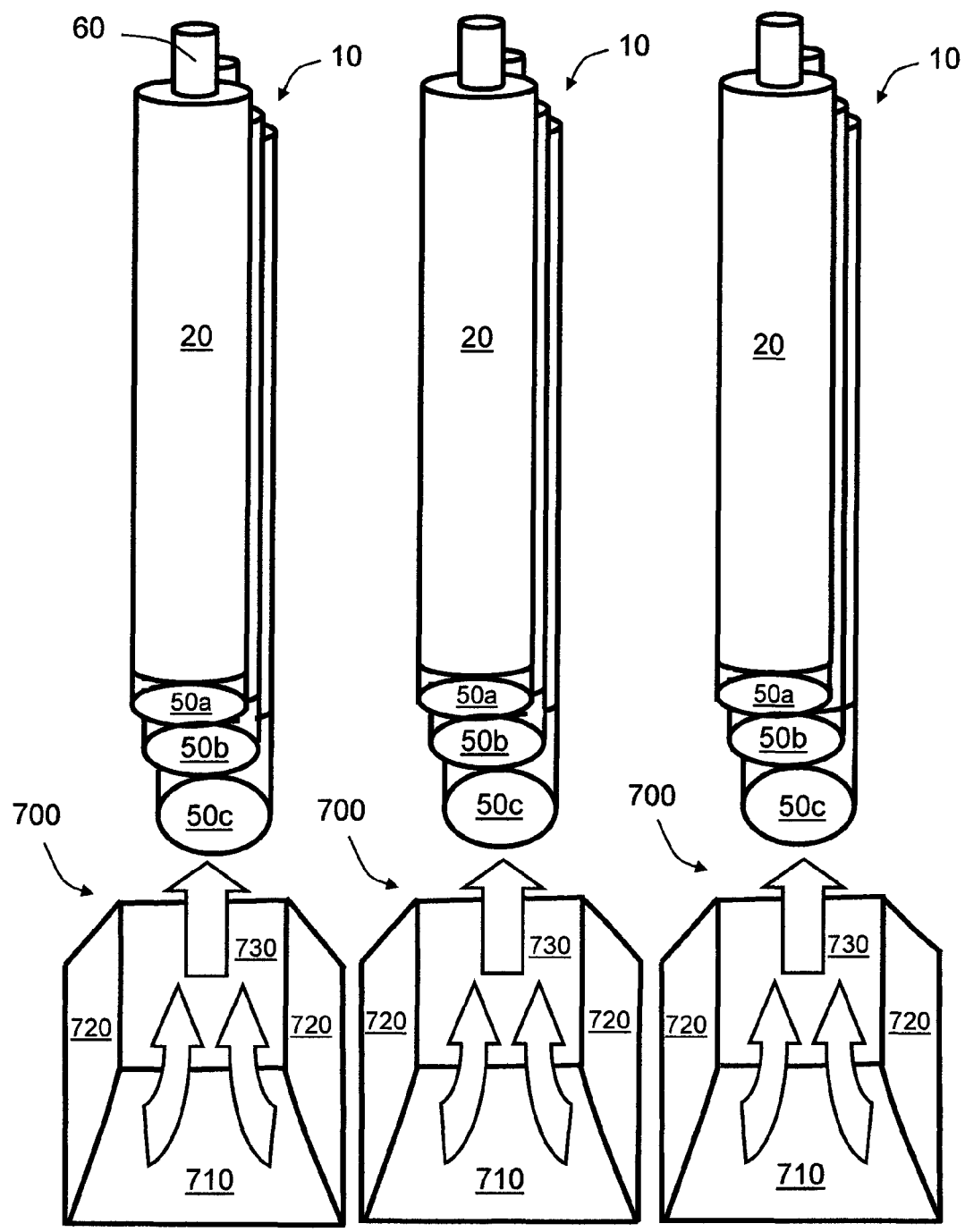

FIG. 12 is a plan view illustration of the ocean wave energy system of FIG. 4 equipped with a substantially central service building, wherein the plan view provides an illustration of a configuration of hexagonal modules assembled together to provide a platform for the system; and FIG. 13 is an illustration of an array of wave energy converters provided with corresponding wave energy reflectors near ports of the converters for improving their energy conversion efficiency.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

Figure 1:
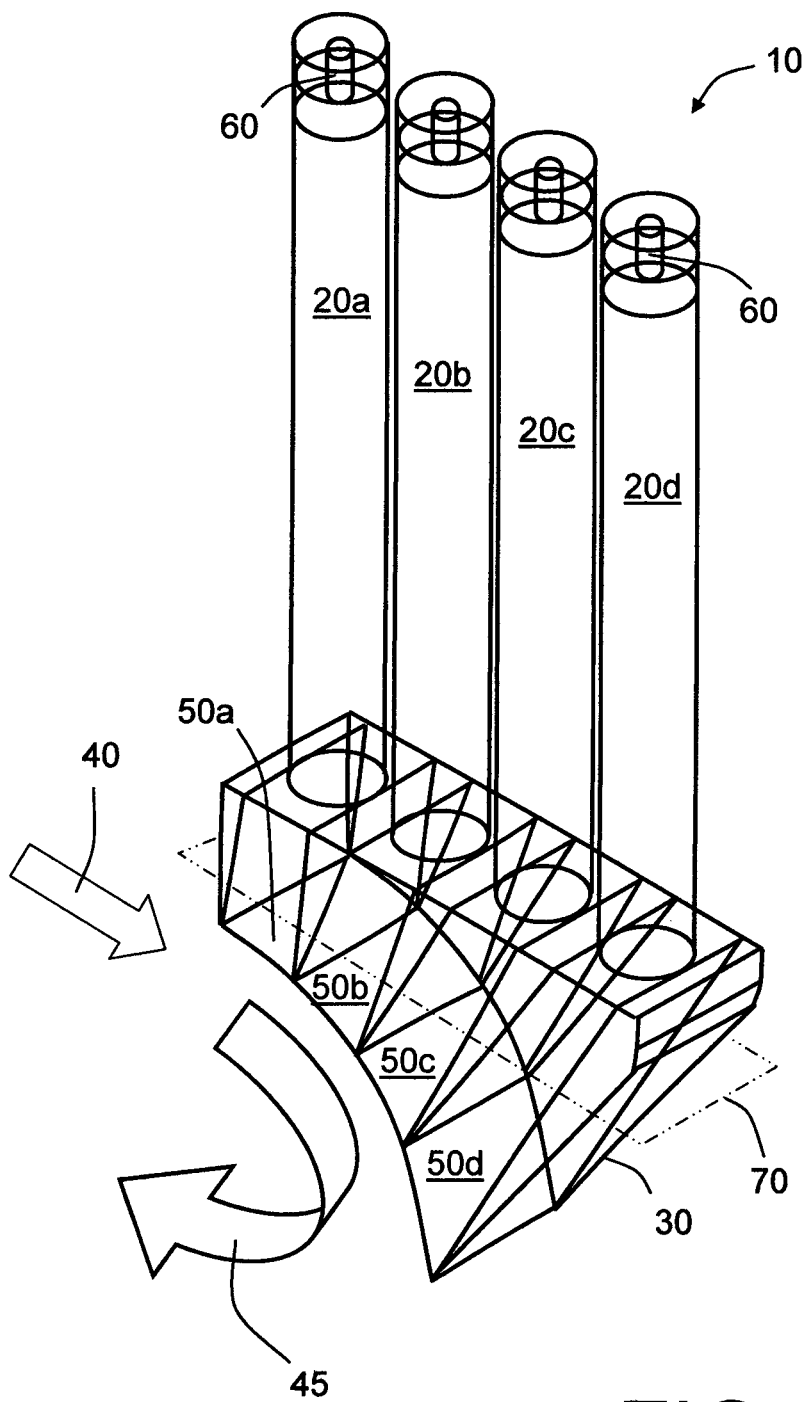
FIG. 1 is an illustration of an embodiment of a wave energy converter pursuant to the present invention, wherein elongate axes of the ports of the wave energy converter become of progressively shallower angle relative to an ocean surface as the ports are disposed deeper into the ocean.
Figure 2:
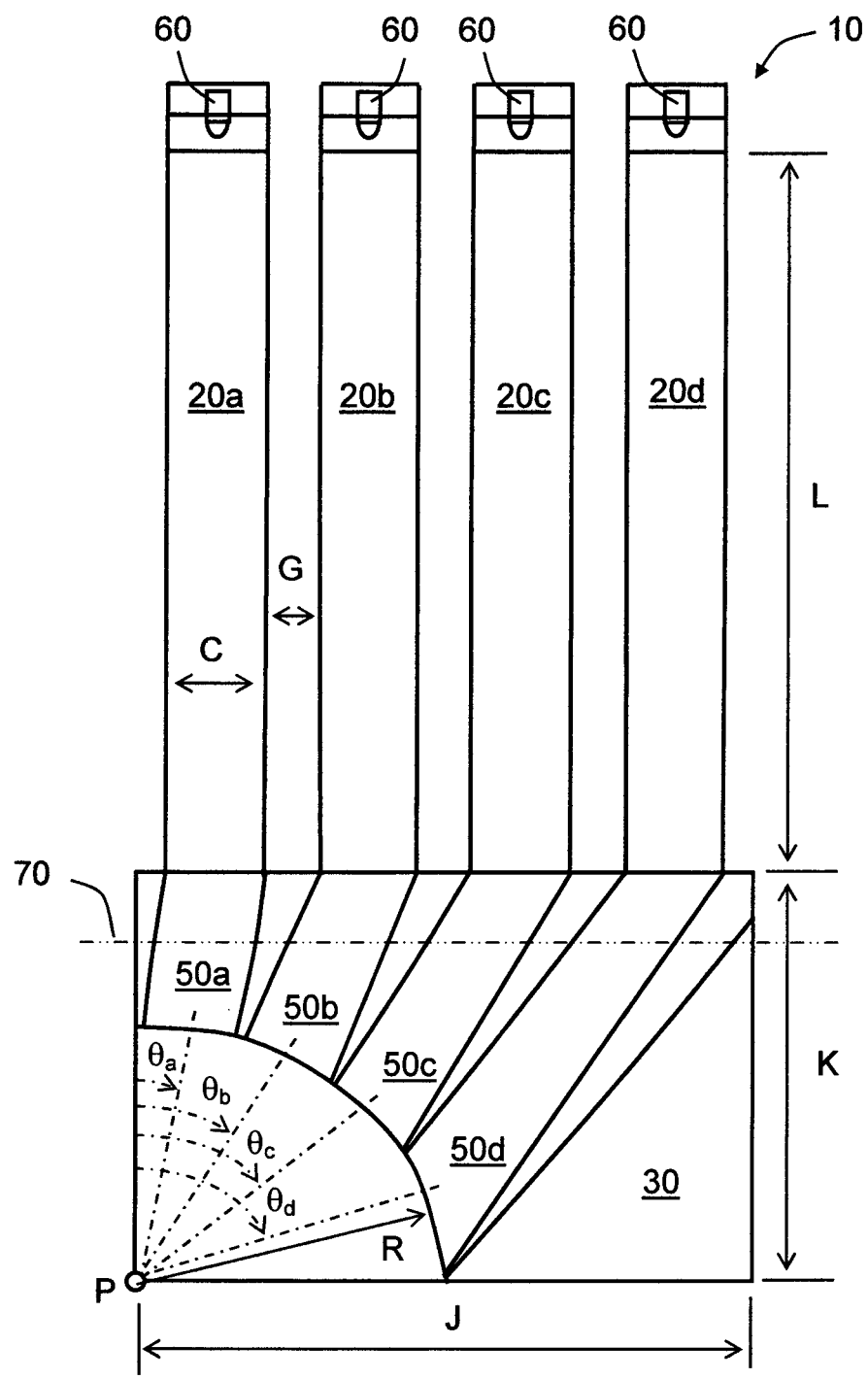
FIG. 2 is a schematic side view of the wave energy converter of FIG. 1.

Referring to FIG. 1, the present invention concerns in overview a wave energy converter 10 including a plurality of substantially enclosed air columns 20a, 20b, 20c, 20d coupled via a port arrangement 30 into fluidic communication with ocean waves propagating in an ocean in a horizontal wave propagation direction substantially as denoted by an arrow 40, for example a forward direction. The port arrangement 30 includes port channels 50a, 50b, 50c, 50d coupled at their upper ends to the air columns 20a, 20b, 20c, 20d respectively and also at their lower ends to the ocean waves, wherein the port channels 50a, 50b, 50c, 50d have their lower ends at progressively greater depths along the forward direction defined by the arrow 40, and have their elongate axis orientation angles at progressively shallower angles along the forward direction defined by the arrow 40 relative to a surface of the ocean; alternatively defined, the port channels 50a, 50b, 50c, 50d have their lower ends at progressively greater depths along the forward direction defined by the arrow 40, and have their elongate axis orientation angles at progressively greater angles θ along the forward direction defined by the arrow 40 relative to a substantially elongate vertical axis of the air columns 20a, 20b, 20c, 20d as illustrated in FIG. 2. Optionally, the air columns 20a, 20b, 20c, 20d are operated with their respective elongate axes disposed in substantially a vertical orientation. Optionally, an energy pickoff device 60, for example an air-propelled Wells-type turbine, is included at an upper end of each air column 20a, 20b, 20c, 20d, namely remote from the lower ends of the port channels 50a, 50b, 50c, 50d which are directly in communication with the ocean waves. Alternatively, or additionally, the energy pickoff devices 60 are implemented as one or more open hydro-turbines which are operable to be in direct contact with ocean waves at a lower portion of the air columns 20a, 20b, 20c, 20d, and/or their associated port channels 50a, 50b, 50c, 50d; optionally, the hydro-turbines disposed towards a bottom region of the air columns 20a, 20b, 20c, 20d, and/or their associated port channels 50a, 50b, 50c, 50d are edge-supported to render them exceptionally robust to the forces of ocean waves received thereat in adverse weather conditions. Such a disposition of the lower ends of the port channels 50a, 50b, 50c, 50d results in the ocean waves being progressively decelerated and efficiently absorbed at the converter 10 to generate corresponding energy at the energy pickoff devices 60 at the upper ends of the air columns 20a, 20b, 20c, 20d as a first component of the ocean waves is forced to exhibit a downwardly directed motion denoted by 45, whereas a second component of the ocean waves coupled into the port channels 50a, 50b, 50c, 50d; the downwardly directed motion can be considered to be a form of "vortex" formation, although a majority of flow associated with the ocean waves is coupled into the port channels 50a, 50b, 50c, 50d. The port arrangement 30 is implemented to provide an optimal absorption of ocean wave energy, whilst substantially avoiding transmission or reflection of wave energy, and whilst being of a general compact size and therefore efficient in use of construction materials. Beneficially, the converter 10 is operable to absorb efficiently both potential energy and kinetic energy of fluid mass associated with the ocean waves to provide an enhanced degree of energy conversion within the converter 10, for example in excess of 30% of ocean wave kinetic and potential energy to electrical energy output at the energy pickoff devices 60, more preferable in excess of 50% of ocean wave kinetic and potential energy received at the converter 10.

The port channels 50a, 50b, 50c, 50d together with their associated air columns 20a, 20b, 20c, 20d and energy pickoff devices 60 are operable to function at relatively low pressures excursions so that heating effects associated with air being compressed in the columns 20a, 20b, 20c, 20d is reduced so as to provide for greater energy conversion efficiency. Beneficially, the energy pickoff devices 60 are operable to function with relatively small pressure differences thereacross, for example by employing large diameter turbines fabricated from light materials, for example reinforced Carbon fibre, to keep their mass low. By "relatively low pressure" is meant in a range of 100's of Pascals to a few 1000's of Pascals.

The port channels 50a, 50b, 50c, 50d together with their associated air columns 20a, 20b, 20c, 20d are beneficially arranged to operate in a resonant mode, for example by carefully controlling an amount of energy pickoff at the energy pickoff devices 60, so as to obtain a desired degree of damping, namely resonant Q-factor. Moreover, a natural period of resonance of water within the port channels 50a, 50b, 50c, 50d and their associated columns 20a, 20b, 20c, 20d is susceptible to being computed from Equation 1 (Eq. 1):

$$T_n = 2\pi \sqrt{\frac{M}{k}} \quad \text{Eq. 1}$$

wherein $T_n$=period of resonance;

M=mass of water in the port channel 50 and optionally its column 20;

k=coefficient of stiffness of water plane area.

As the mass M varies depending upon the height of water in the converter 10, the converter 10 is beneficially optionally tuned to a frequency characteristic of ocean waves to be received at the converter 10 for obtaining optical energy conversion; such adjustment of height is conveniently achieved by suitably ballasting a system onto which the converter 10 is mounted. In very severe storm conditions, the port channels 50a, 50b, 50c, 50d are beneficially submerged more deeply into the ocean to provide better protection against damage, especially in view of the ocean waves being surface waves such that most of their energy field is close to the ocean surface.

Optionally, as illustrated in FIG. 1, the port arrangement 30 is fabricated from planar panels, for example steel panels of a type frequently used for contemporary ship building and offshore constructions. The panels are beneficially cut to suitable size, for example by way of Carbon Dioxide laser cutting, and then assembled, or otherwise joined, together, for example by continuous welding seams formed at interfaces whereat the panels mutually meet. Moreover, the air columns 20a, 20b, 20c, 20d are beneficially implemented in cylindrical form as illustrated, wherein a cylindrical form is best able to withstand pressure surges in adverse weather conditions occurring within the columns 20a, 20b, 20c, 20d; moreover, a cylindrical form is often available in a form of standard component parts, for example continuously welded steel pipe, Carbon-fibre or fibreglass-reinforced composite materials pipes, marine-grade cast concrete pipes or any combination of these. Optionally, the air columns 20a, 20b, 20c, 20d are manufactured to have a polygonal cross-section, for example a rectangular cross-section or hexagonal cross-section. Optionally, the air columns 20a, 20b, 20c, 20d are manufactured from planar sheet components which are joined together, for example via continuous welding. Conveniently, as illustrated in FIG. 2, the pipes have a diameter C in a range of 1 meter to 2 meters, more preferably a diameter in a range of 1.3 meters to 1.9 meters, and most preferably a diameter of substantially 1.6 meters. The air columns 20a, 20b, 20c, 20d beneficially have an elongate length L in a range of 5 to 25 meters, and more preferably an elongate length L of substantially 14 meters up to a lower end of the energy pickoff devices 60. Although FIG. 1 and FIG. 2 illustrate four columns 20a, 20b, 20c, 20d and an associated port arrangement 30 to suit, there are optionally included two or more columns 20 in the converter 10. Optionally, for the converter 10, the four columns 20a, 20b, 20c, 20d and associated port arrangement 30 are implemented as an integral assembly, for example as a mass-produced module.

Although the aforesaid converter 10 is beneficially operated so that the direction of wave propagation 40 is a forward direction as illustrated, it will be appreciated that the converter 10 can be used with waves arriving at the converter 10 from oblique angles, and even from a backwards direction which is opposite to the forward direction.

Referring to FIG. 2, the ports of the port arrangement 30 have an angular disposition of angles $\theta_a$, $\theta_b$, $\theta_c$, $\theta_d$ for the columns 20a, 20b, 20c, 20d respectively, relative to an elongate axis of the columns 20a, 20b, 20c, 20d as illustrated. Optionally, the angles $\theta_a$, $\theta_b$, $\theta_c$, $\theta_d$ of the ports 50a, 50b, 50c, 50d are substantially 10°, 30°, 50°, 75° respectively, although other angular dispositions are feasible for implementing the present invention. The air columns 20a, 20b, 20c, 20d beneficially have a separation distance G, wherein the distance G is optionally substantially 0.88 meters. Moreover, the port arrangement 30 optionally has a height K and a breadth J as illustrated in FIG. 2, wherein the height K is optionally substantially 8 meters and the breadth J is optionally substantially 10 meters. The port arrangement 30 beneficially has a width, as seen in a direction of the arrow 40, of substantially 3 meters. Such sizes for the columns 20a, 20b, 20c, 20d and the port arrangement 30 are approximately comparable to a wavelength of ocean waves which the converter 10 is designed to convert to output power, for example output power from the energy pickoff devices 60. Optionally, the columns 20a, 20b, 20c, 20d and the port arrangement 30 are of a size which enables resonant absorption of ocean waves to occur within the converter 10, thereby enhancing conversion efficiency of the converter 10. Optionally, the columns 20a, 20b, 20c, 20d are dynamically tuned in operation, for example by varying their effective length L and/or diameter C, for example by using actuated baffles or similar within the columns 20a, 20b, 20c, 20d.

The converter 10 is operable to steer incoming ocean waves approaching in a direction of the arrow 40 into a decelerating downwardly-directed vortex 45 which increases pressure of the vortex 45 with depth into the ocean and hence is especially efficient at extracting ocean wave energy in a relative small volume, without significant reflection or transmission of the ocean waves. Such a manner of operation is fundamentally different to known contemporary ocean wave energy converters.

Figure 3A:
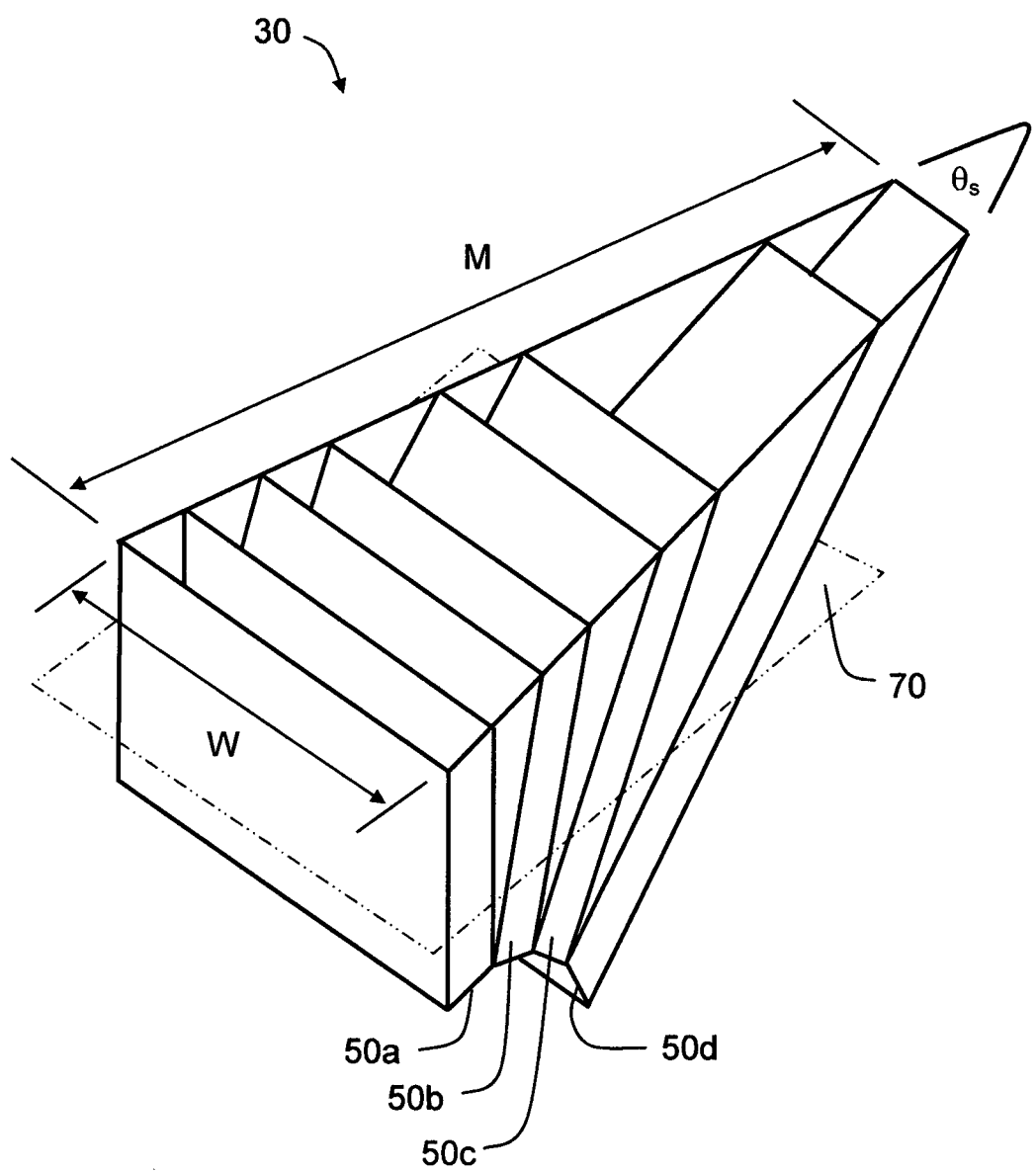
FIG. 3A is an illustration of an alternative implementation of a portion of the wave energy converter of FIG. 1, wherein the wave energy converter has a tapered form.

The converter 10 is optionally designed to be arranged in arrays, wherein the arrays can be of curved form or linear form depending upon application in a system. For example, in FIG. 3, the port arrangement 30 designed to have a radially tapered form having a taper angle $\theta_s$ in a range of 15° to 30°, and more optionally substantially 23°, with a length M in an order of 12 meters and widest width W of substantially 6.1 meters, although other sizes for the port arrangement 30 of FIG. 3 are feasible when implementing the present invention. The port arrangement 30 of FIG. 3 is conveniently manufactured by joining planar sheets of material together, for example by way of continuously welding sheet steel components together. Alternatively, the port arrangement 30 can be implemented as a reinforced concrete cast component.

The converter 10 as described in the foregoing is susceptible to being mounted onto various types of platform for implementing ocean wave energy systems. Alternatively, the converter 10 can be mounted in arrays to provide coastal defences, for example to reduce coastal erosion and/or to create calm ocean conditions in a wake of the arrays, for example for aquaculture and/or for harbour facilities.

Figure 3B:
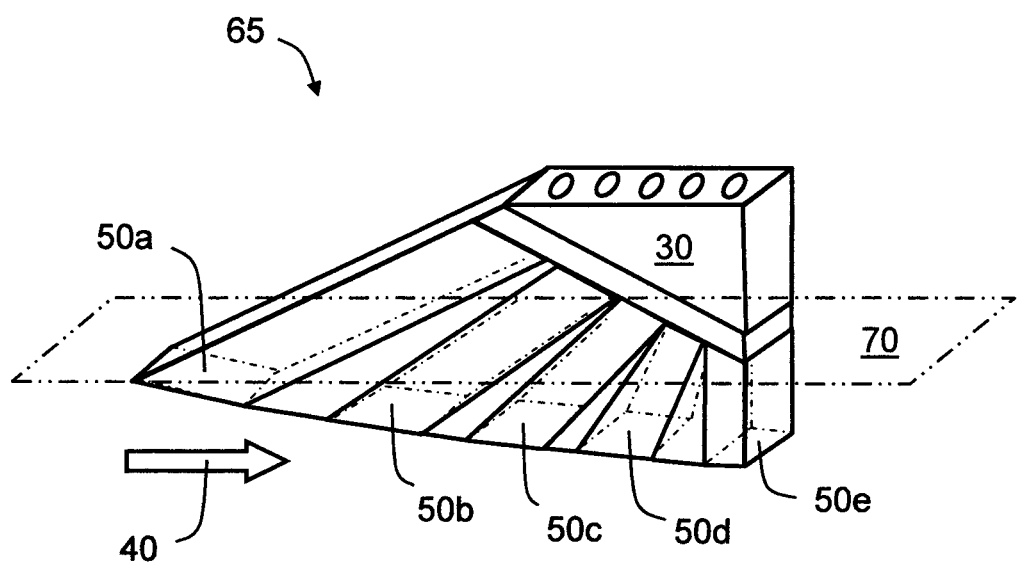
FIG. 3B is an illustration of an alternative implementation of a wave energy converter pursuant to the present invention, wherein elongate axes of the ports of the wave energy converter become of progressively steeper angle relative to an ocean surface as the ports are disposed deeper into the ocean.

Referring to FIG. 3B, the wave energy converter 10 is alternatively implemented, as indicated generally by 65, such that, for a forward direction of ocean waves 40, the five ports 50a, 50b, 50c, 50d, 50e are arranged along the direction 40 and the five ports 50a, 50b, 50c, 50d, 50e have progressively steeper angles for their elongate axes relative to a plane of an ocean surface 70 as the ports 50a, 50b, 50c, 50d, 50e are disposed progressively deeper, namely as illustrated. Optionally, the port 50a has its elongate axis at an angle of substantially 45° relative to the ocean surface 70, and the port 50e has its elongate axis substantially orthogonal relative to the ocean surface 70; the intermediate ports 50b, 50c, 50d have their elongate axes at intermediate angles between 45° and substantially orthogonal relative to the ocean surface 70.

Referring next to FIG. 4, there is shown an ocean wave energy system indicated generally by 100. The system 100 includes a buoyant platform 110 having a plurality of peripheral outwardly-projecting lobes 120. For example, the platform 110 has a polygonal plan form, and the peripheral outwardly-projecting lobes 120 are disposed at facets of the polygonal plan form. Optionally, the platform 110 has a hexagonal plan form as illustrated. Optionally, the lobes 120 have outwardly-rounded peripheral edges along which a plurality of converters 10 are disposed as illustrated. Optionally, a plurality of the system 100 can be deployed along a coastline and anchored to a seabed; for example, the plurality of the systems 100 can be mutually coupled together, for example via chains or cables, to form a floating network.

In storm conditions, the system 100 is robust, namely it is extremely difficult to cause it to flip over, and waves of excess magnitude are conveniently able to wash over an upper surface of the lobes 120 and the platform 110 and thereby dissipate their excess energy. The system 100 can be used for generating power, for example electrical power; alternatively, the system 100 can be used as a coastal defence or fjord defence to protect coastlines from a full impact of ocean waves, for example as a barrier against tsunami-type waves. The platform 110 and its lobes 120 are beneficially fabricated from one or more of: concrete, metal panels, plastics composite materials. Moreover, the converter 10 as illustrated in FIG. 4 is beneficial to employ when implementing the system 100. During manufacture, the system 100 employs numerous mutually similar component parts which are susceptible to being mass-produced to reduce manufacturing cost. Moreover, the system 100 is beneficially assembled in calm water and then towed to its final location for deployment.

Figure 5:
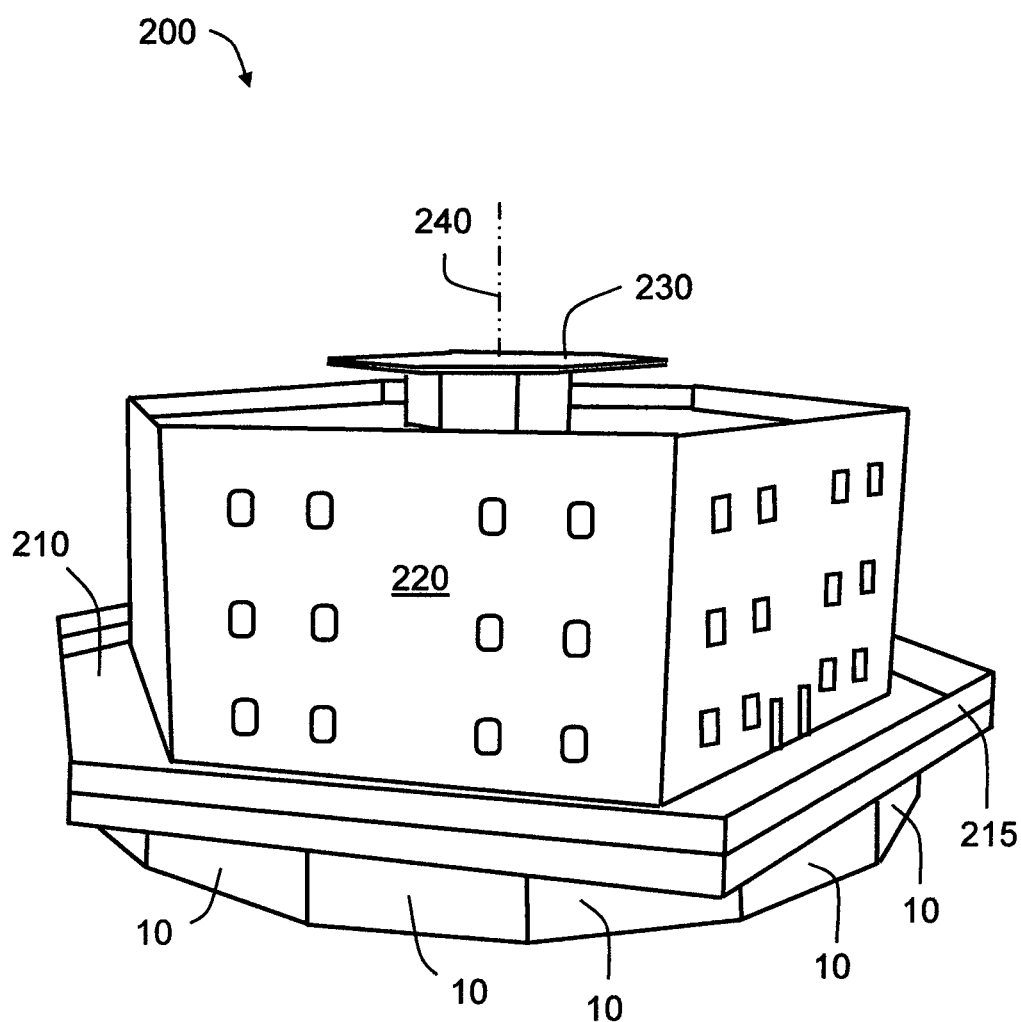
FIG. 5 is an illustration of an above-sea-level portion of an ocean wave energy system including a peripheral arrangement of wave energy converters pursuant to at least one of FIG. 1 to FIG. 3B.
Figure 6:
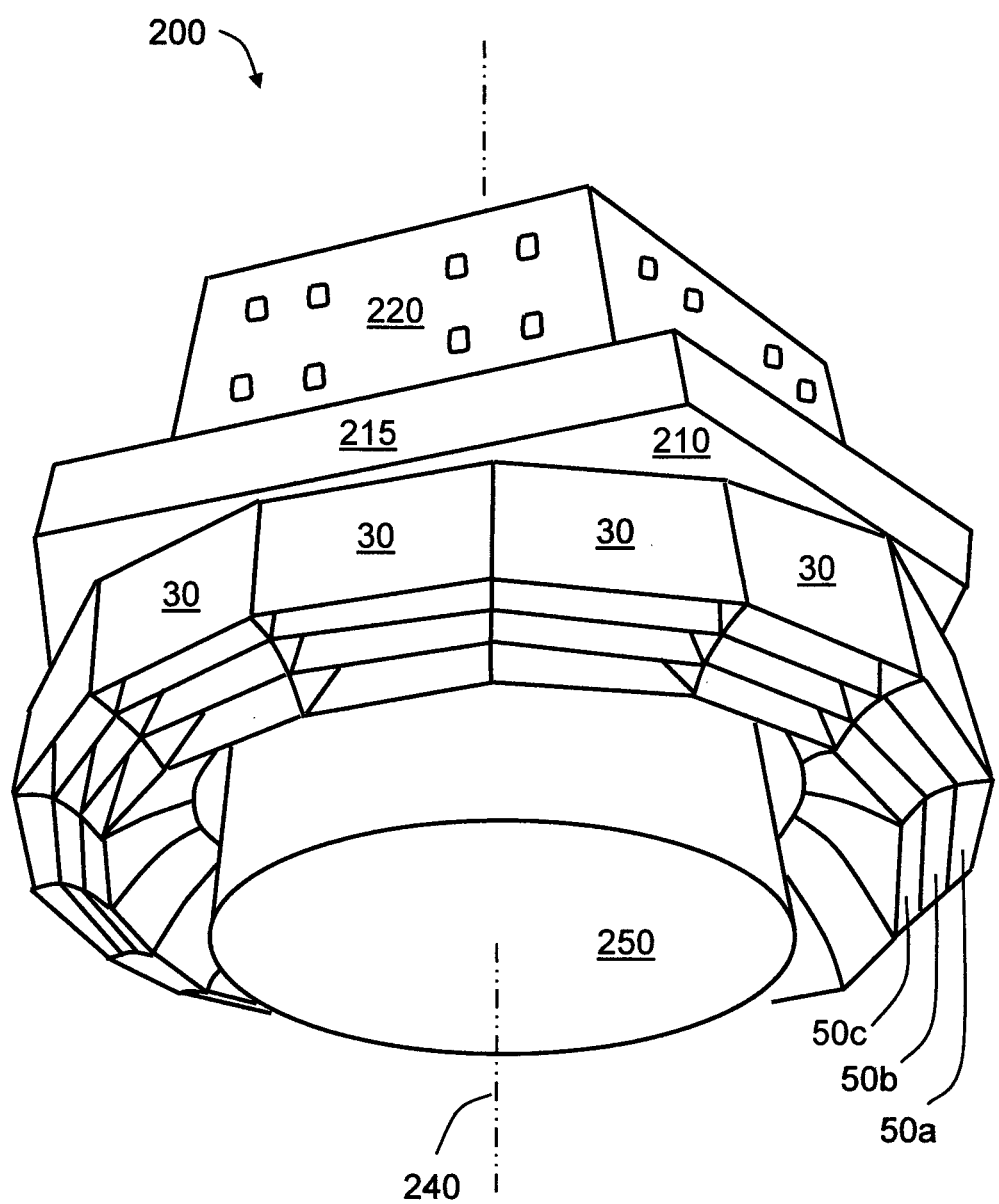
FIG. 6 is an illustration of an underside portion of the ocean wave energy system of FIG. 5.

Referring next to FIG. 5, there is shown an alternative system indicated generally by 200. The system 200 includes at its lower peripheral edge a plurality of the converters 10, and a buoyant platform 210 thereabove including a peripheral safety railing 215. Onto the platform 210 is included a service building 220, for example personnel quarters and/or turbine generator facilities. Optionally, a helicopter pad 230 is included on a roof of the service building 220. The system 200 is designed to float as an island, and the converters 10 are disposed in a ring-like manner substantially around a periphery of the platform 210 and are operable to provide electrical power to the service building 220. Optionally, the service building 220 and the platform 210 have a polygonal form, for example a hexagonal form as illustrated. Optionally, the platform 210 overhangs the converters 10 in a vicinity of the railings 215. In FIG. 6, an underside view of the system 200 is provided, illustrating that each converter 10 includes three ports 50$a$, 50$b$, 50$c$ whose depth into water increases progresses respectively in a direction towards a central vertical axis 240 of a central cylindrical base 250 of the system 200; in other words, the port 50$b$ extends deeper into water than the port 50$a$ in operation, and the port 50$c$ extends deeper in operation into water than the port 50$b$ as illustrated. Moreover, the ports 50A, 50$b$, 50$c$ have progressively increasing angles $\theta$ relative to the central vertical axis 240 of symmetry of the system 200 in a direction towards the central vertical axis 240 of symmetry. The central cylindrical base 250 beneficially includes a heavy ballast mass at a lower portion thereof to provide the system 200 with intrinsic stability when floating in water; in other words the system 200 is buoyant in a manner of a floating island. The central base 250 is beneficially fabricated from reinforced marine-grade concrete and/or welded steel plate. Optionally, the system 200 is adapted to be mounted around a base of an offshore wind turbine, thereby providing a synergistic collocation of wind power generation and ocean wave power generation.

Figure 7:
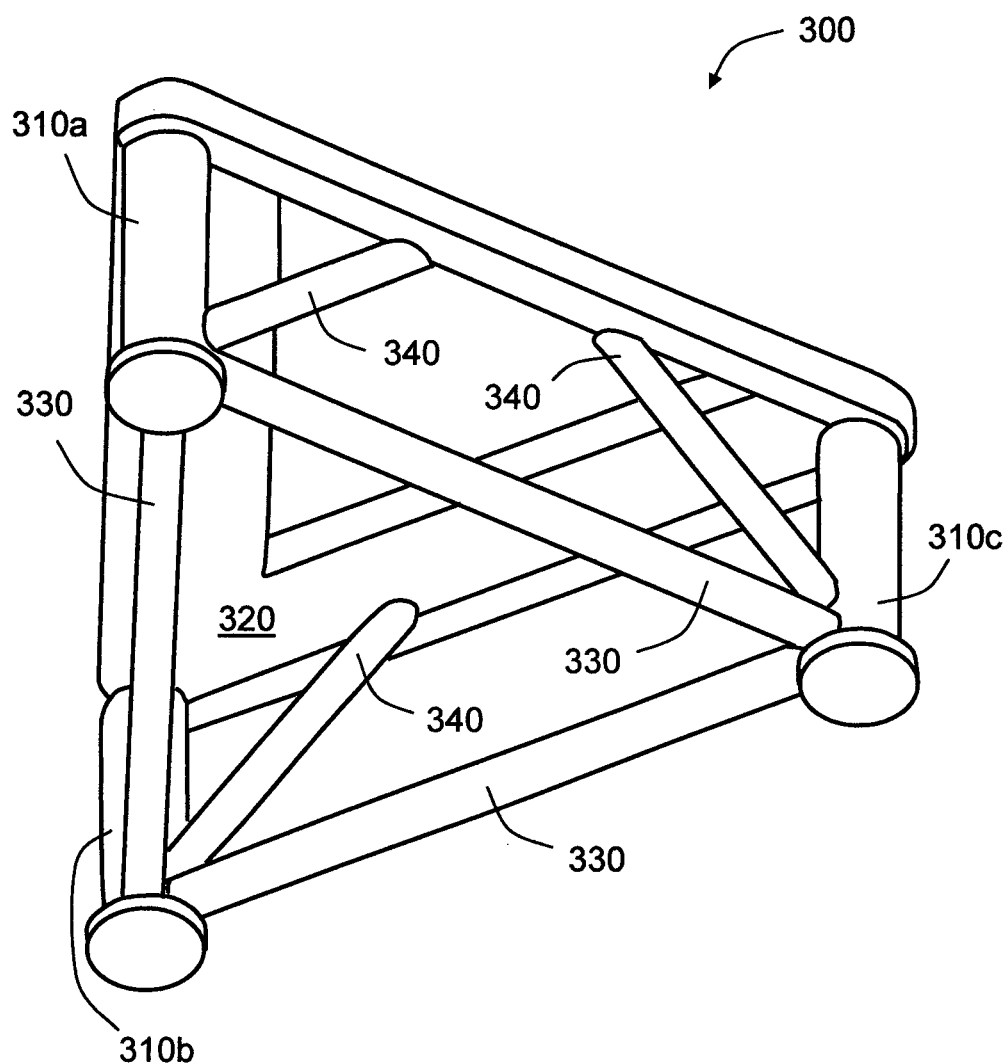
FIG. 7 is an illustration of a frame of an alternative ocean wave energy system including a peripheral arrangement of wave energy converters pursuant to at least one of FIG. 1 to FIG. 3B.
Figure 8:
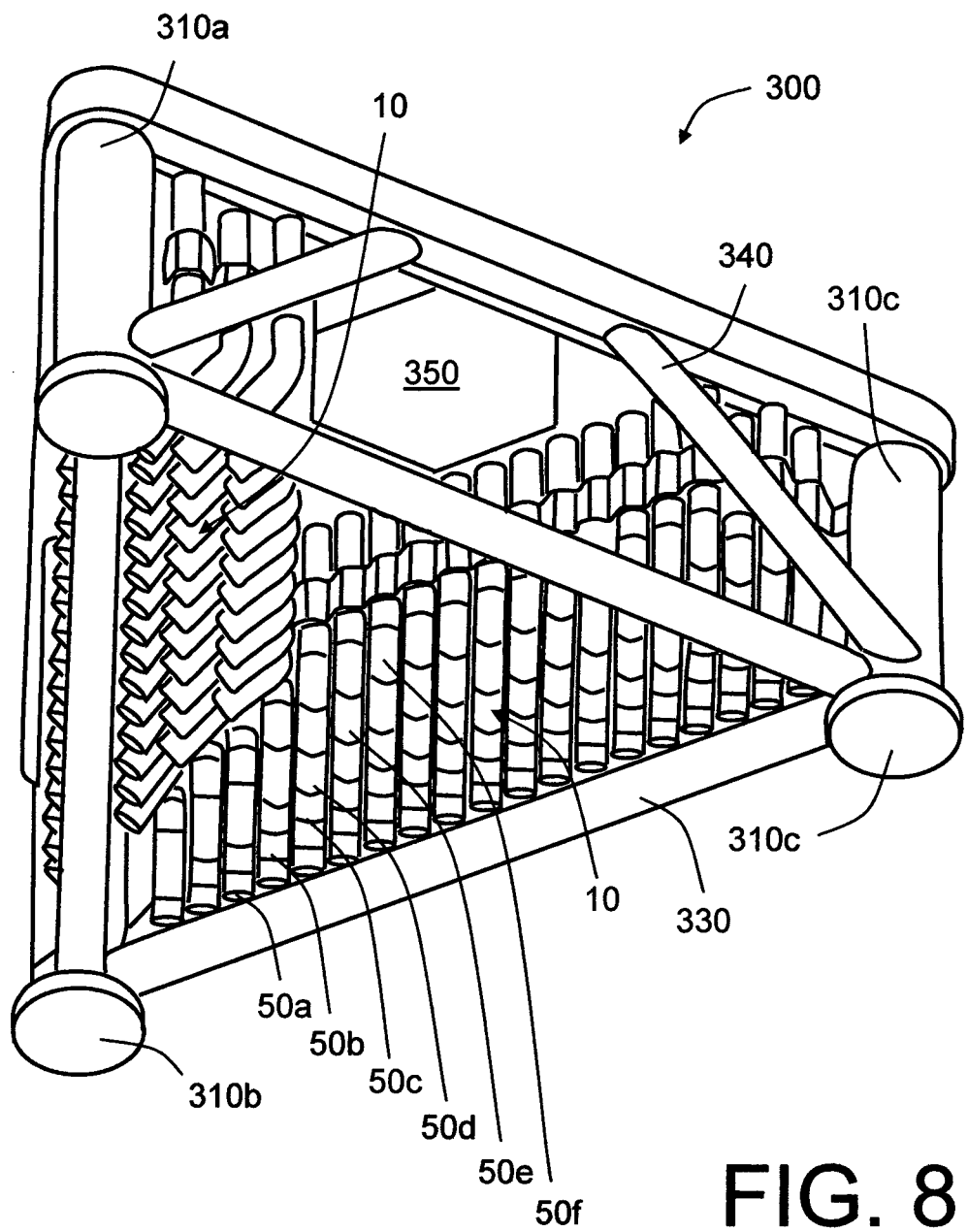
FIG. 8 is an illustration of an underside of the alternative ocean wave energy system of FIG. 7 with its wave energy converters shown installed into position.
Figure 9:
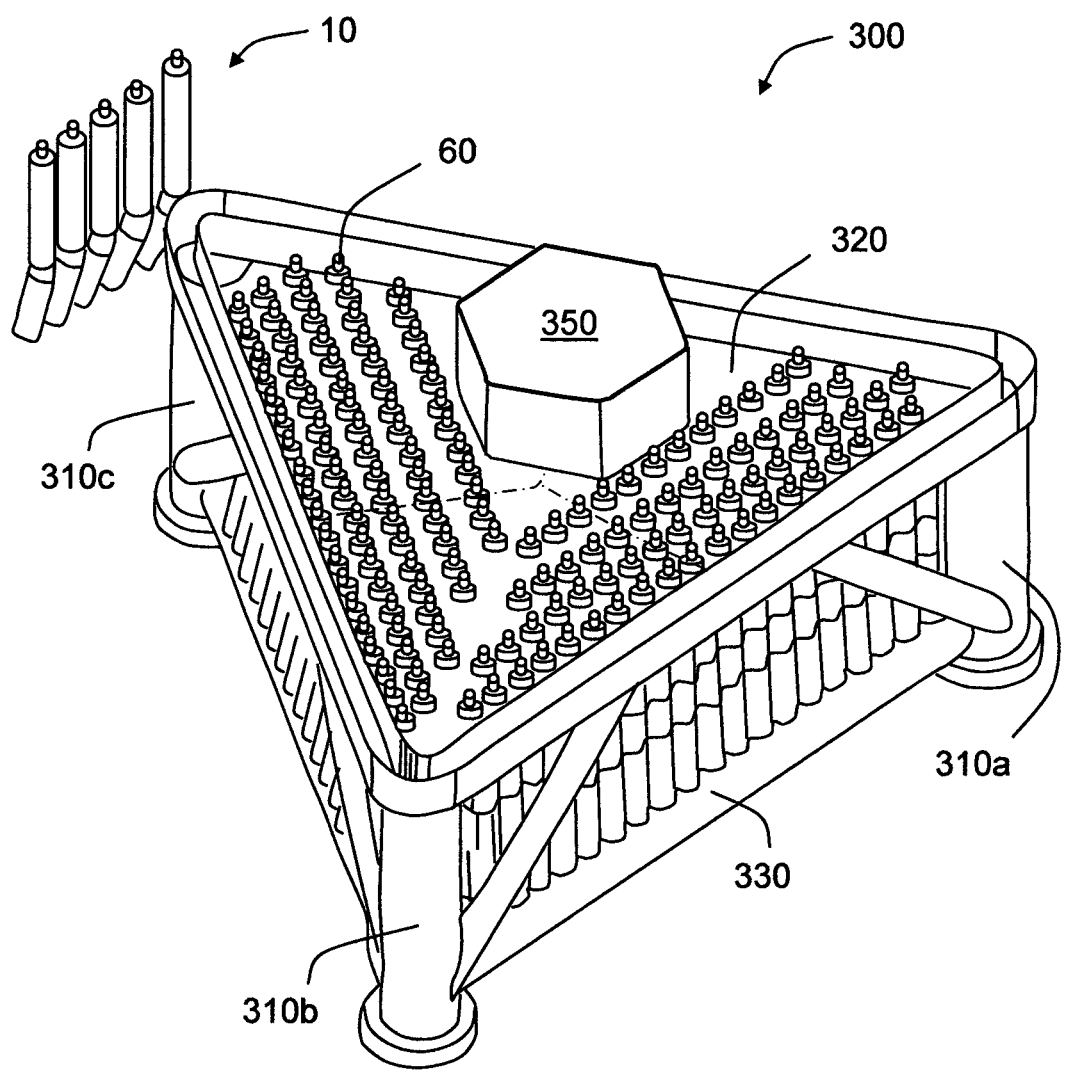
FIG. 9 is an illustration of an upper side of the alternative ocean wave energy system of FIG. 7 with its wave energy converters shown installed into position.

Referring next to FIG. 7, FIG. 8 and FIG. 9, there are shown illustrations of a system indicated generally by 300 and including a plurality of the aforementioned converters 10. The system 300 is based upon a frame as illustrated in FIG. 7, wherein the frame includes three hollow buoyant cylindrical towers 310$a$, 310$b$, 310$c$ disposed substantially at their upper ends at three corners of an equilateral triangular upper platform denoted by 320 as illustrated. Transverse members 330 mutually couple substantially lower ends of the hollow buoyant cylindrical towers 310$a$, 310$b$, 310$c$ together as illustrated to provide a robust geometrical configuration for the frame. Diagonal members 340 coupling between the platform 320 and the hollow buoyant cylindrical towers 310$a$, 310$b$, 310$c$ are beneficially provided to provide the frame with enhanced robustness to withstand severe ocean weather conditions when in operation. Superficially, the frame appears akin in its manner of construction to contemporary floating oil and gas exploration and production platforms, for example as contemporarily employed offshore in Norway to provide oil and gas exploration and production. The frame is beneficially susceptible to being fabricated in shipyards which have hitherto manufactured aforesaid contemporary floating oil and gas exploration and production platforms. Optionally, the frame is fabricated from various steel components which a welded and/or bolted together. As illustrated in FIG. 8, the frame is arranged to accommodate a plurality of converters 10 having ports 50$a$ to 50$f$ which are progressively of greater angle relative to vertical, and of greater depth towards a central vertical axis of the system 300 when deployed in operation. All the ports 50$a$ to 50$f$ face outwardly from the central vertical axis as illustrated. Optionally, the ports 50$a$ to 50$f$ have a circular cross-sectional profile as illustrated. A service housing 350 is included for accommodating one or more generators, personnel and such like. In operation, it is beneficial that the cylindrical tower 310$b$ is orientated towards a prevailing ocean wave propagation direction. The system 300 is of benefit in that it can be manufactured in regions of calm water and then towed out to its intended location of operation. Moreover, the system 300 is beneficially retained in position by one or more anchors secured to a seabed in a vicinity of where the system 300 is intended to operate. Beneficially, boat docking facilities are included between the cylindrical towers 310$a$, 310$c$, namely in a wake of the system 300 substantially devoid of ocean waves, for enabling maintenance vessels to dock with the system 300 when required. As illustrated in FIG. 9, the energy pickoff devices 60 are disposed substantially at a height of the platform 320 and are readily accessible to personnel accommodated in the service housing 350; such deployment of the devices 60 enables the devices 60 to be conveniently repaired, serviced or replaced by personnel whilst the system 300 is in operation. Optionally, the devices 60 of the system 300 are coupled to a central turbine accommodated in the service housing 350; alternatively, each device 60 includes its own turbine and generator so that each column 20 of the converters 10 is capable of functioning in a mutually autonomous manner. Beneficially, the devices 60 are remote from the ports 50 and hence, to an extent, are well protected from large magnitude waves in storm or hurricane conditions experienced at the ports 50. In FIG. 9, an example converter 10 of the system 300 is shown inset, namely adjacent to, the system 300 for illustration purposes only.

Each converter 10 of the system 300 is capable in operation, for example in Norwegian, Japanese or Scottish offshore locations, of generating ten's of kiloWatts (kW) of power, such that the system 300 is potentially capable of generating in total an order of 10 MegaWatts (MW) to 500 MegaWatts (MW) of power, namely comparable to a small nuclear reactor but without any risk of radioactive contamination or thermal runaway. Moreover, the system 300 is capable of generating in its wake calmer ocean water which is conducive to supporting aquaculture. When its service life is complete, the system 300 can be towed into harbour, and its materials recycled for manufacturing other products. Such desirable characteristics render the system 300 an attractive option for sustainable low-Carbon energy production at a cost which is potentially less than a total life-timecycle cost of generating nuclear power. The system 300 is thus especially suitable for countries such as Japan which are seismically active and thus unsuitable for nuclear power. The system 300 can be deployed in large numbers along a coastline, with spaces therebetween for allowing access to shipping, lifeboats and similar. Moreover, the system 300 can be deployed at distances offshore whereat they do not disfigure the natural beauty of coastlines. Additionally, the system 300 has a relatively low height profile in comparison to offshore wind turbines, and hence does not interfere significantly with coastal radar. The system 300 is capable of being constructed in existing shipyards using known construction techniques, and hence represents an attractive product to manufacture when the demand for offshore oil and gas exploration and production platforms eventually declines in future as a result of depletion of geological fossil oil and gas reserves. Optionally, the platform 320 can be provided with a protective cover fabricated, at least in part, from photovoltaic cells for converting solar radiation to electric power and also providing personnel with a more comfortable environment on the platform 320 for servicing the energy pickoff devices 60.

Optionally, the system 300 is provided with one or more submerged structures beneath the converters 10 for providing an optimal absorption of ocean wave energy. Optionally, the one or more submerged structures are adjustable to provide dynamically controlled absorption, for example favouring certain specific wavelengths of ocean waves. Optionally, the one or more submerged structures are planar in form, and are disposed to enhance generation of the aforesaid vortex 45. Optionally, buoyancy of one or more of the cylindrical towers 310a, 310b, 310c is adjusted in operation to raise or lower the ports 50 of the plurality of converters 10 for achieving optimal ocean wave energy absorption and/or optimal energy generation within the system 300. Optionally, in severe storm or hurricane conditions, buoyancy of one or more of the cylindrical towers 310a, 310b, 310c is adjusted to lower the system 300 within an ocean environment for enabling the system 300 better to withstand such storms or hurricanes.

Figure 10:
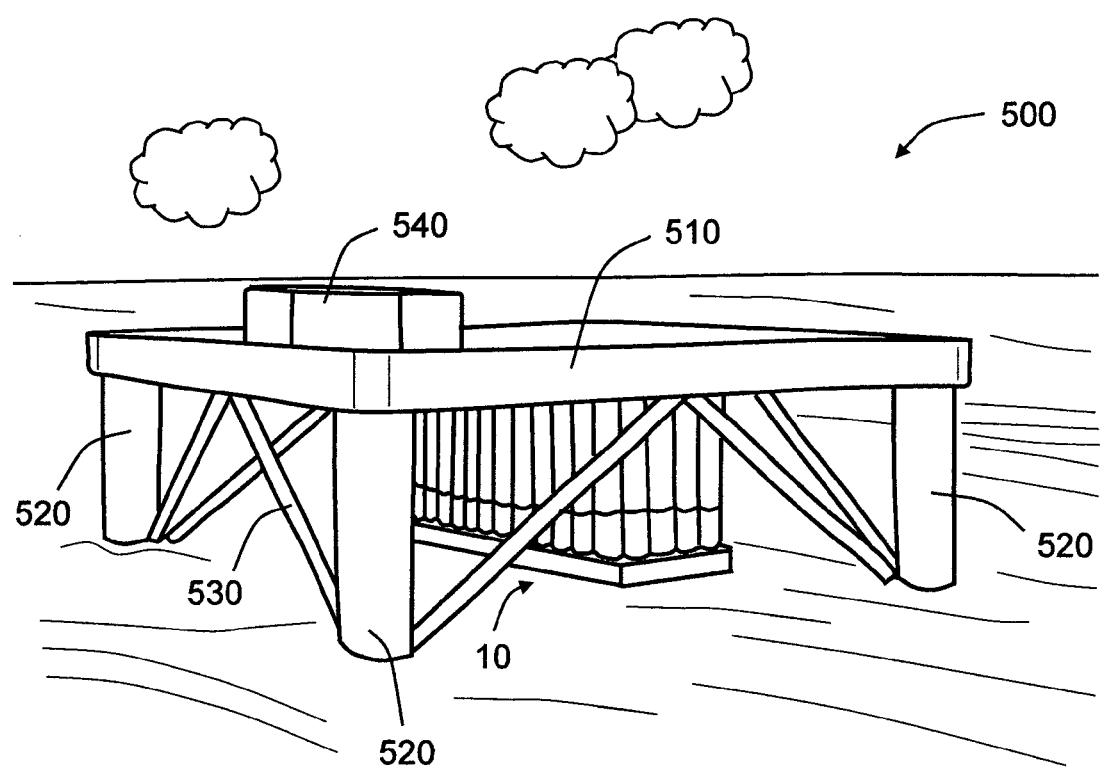
FIG. 10 is an illustration of an alternative ocean wave energy system including a single linear array of wave energy converters deposed upon a platform having four peripheral support cylindrical towers.

Referring next to FIG. 10, there is provided an illustration of an ocean wave energy system indicated generally by 500. The system 500 is based upon a known conventional oil and gas platform including four cylindrical towers 520 at its extremities supporting an upper platform 510 and mutually coupled together via transverse and diagonal strengthening members 530. From the platform 510 is suspended a single array of converters 10 whose port arrangement 30 is disposed substantially at or slightly below an upper surface of the ocean. A service facility building 540 is built onto the platform 510 and beneficially houses personnel, machinery, turbines, spare parts and similar. Optionally, an upper roof surface of the building 540 functions as a helicopter landing pad. The system 500 is beneficially anchored to a seabed of the ocean, and can be towed into position for deployment. Beneficially, the system 500 can also function as a connection point for cables, for example for supporting a wind farm. Optionally, one or more wind turbines can be constructed onto the upper platform 510 for enabling the system 500 to generate energy from both ocean waves and wind. Optionally, the upper platform 510 can support ocean thermal energy conversion (OTEC) power generation apparatus which is operable to generate power from temperature differences with depth encountered in the ocean in a vicinity of the system 500; such OTEC is especially pertinent when the system 500 is employed in tropical oceans.

Figure 11:
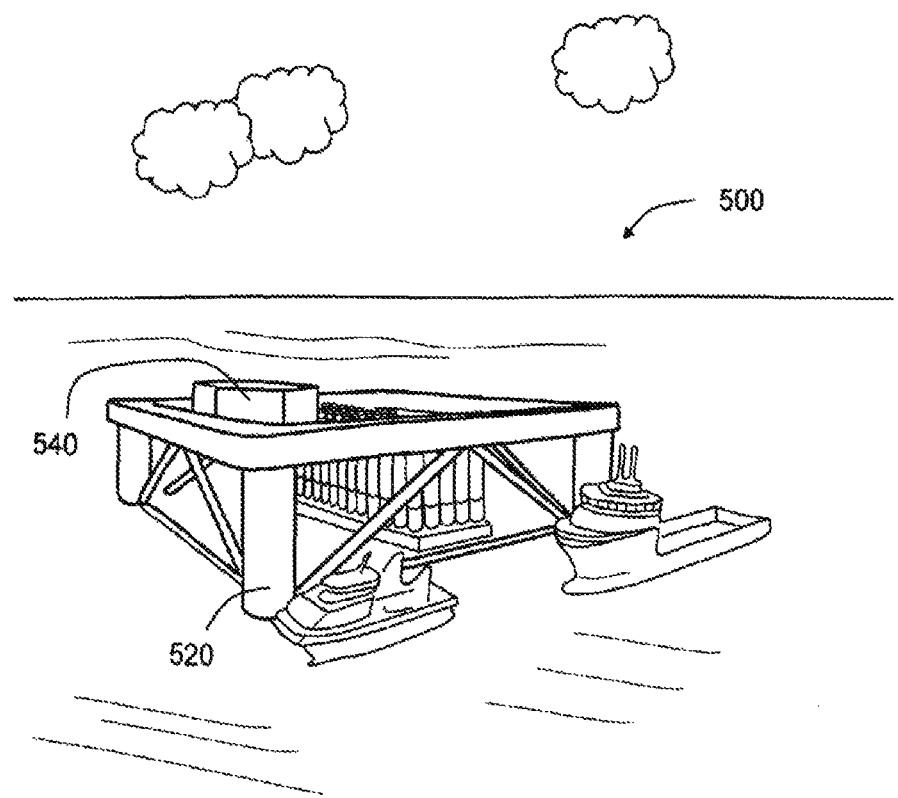
FIG. 11 is an illustration of the ocean wave energy system as illustrated in FIG. 10 with service ships moored alongside to provide an indication of dimensions of the system.

In order to provide an appreciation of dimensions of the system 500, reference is made to FIG. 11. The cylindrical towers 520 are beneficially spaced apart by distances in a range of 100 meters to 500 meters. Optionally, there are included hundred's, or even thousand's, of columns 20 and associated ports 50 and energy pickoff devices 60. Moreover, the system 500 is potentially capable of generating at least 10's of Mega Watts (MW) of electrical power when in operation. A plurality of such systems 500 are susceptible to being coupled together in a spatially-disposed network to provide coastal defences, to create calmed water in a wake of the network which is suitable for aquaculture, for example algae and/or fish farming, to create calmed shipping channels, to provide coastal defences against coastal erosion, to provide floating prisons, to provide floating hotels and similar recreational areas (for example for tax-free sale of goods), and similar. Other systems pursuant to the present invention described in the foregoing are also susceptible to being employed for such diverse applications.

Referring next to FIG. 12, there is shown an ocean wave system indicated generally by 600. The system 600 includes a floating platform fabricated from a plurality of hexagonal modules 610, wherein the platform has thereby outwardly-projecting lobes which are optionally, at least in part, deployed with converters 10 having a port arrangement 30 of angular form as generally depicted in FIG. 3. At a substantially central portion of the platform is included one or more buildings 620, for example living quarters, housings for equipment and similar. Optionally, the system 600 can be employed as a floating hotel, as floating luxury accommodation, as a floating prison, as a floating rehabilitation centre, a floating factory or similar.

In a passive manner of operation, the converters 10 are employed to absorb incoming waves to protect the platform during adverse weather conditions. In an active manner of operation, the converters 10 are employed to generate power for the one or more buildings, for example for heating, lighting, air conditioning and so forth. Optionally, the system 600 is employed as an ocean wave power generator for providing output power, for example via cables to land and/or to convert energy-bearing materials transported to the system 600 which are subsequently collected from the system 600 when processed to increase their state of latent energy. Optionally, a plurality of the systems 600 are anchored to a seabed and coupled together, for example via chains wires, or cables to form a robust network over a surface of the ocean, for example for coastal erosion protection purposes. Optionally, the systems 600 are coupled together via electrical cables, for example to provide a cable network for an offshore wind farm having a spatially distributed arrangement of wind turbines.

Referring next to FIG. 13, there is shown an array of the converters 10, wherein each converter 10 is equipped with a corresponding wave reflector 700 which is operable to in a submerged state. Optionally, the wave reflector 700 is implemented as a simple planar component, for example as a planar baffle. Alternatively, the wave reflector 700 is implemented as a robust 3-diemsional structure including a base 710, side walls 720 and a back wall 730, Optionally, the base 710 and the walls 720, 730 are outwardly tapered towards a forward direction of wave propagation when in use. Optionally, the reflectors 700 are actuated to adjust their spatial positions relative to the ports 50 for obtaining optimal coupling of energy to the columns 20. Use of the reflectors 700 is capable of improving energy coupling efficiency of the converter by a range of two to three times, namely a very significant improvement in wave energy conversion efficiency; such improvement can have a very beneficial impact on the economic attractiveness of the converter 10 for large-scale power generation. The wave reflectors 700 are beneficially fabricated from marine-grade reinforced concrete and/or metal.

Countries such as Japan that have a relatively restricted land area, a large population, a large requirement for aquatic food and a large requirement for energy can benefit greatly from the converter 10 and systems incorporating the converter 10. Such countries may have invested in conventional nuclear technology based upon Zirconia-clad fuel rods which generate considerable nuclear waste; the Zirconia cladding of contemporary fuel rods fails on account of neutron flux exposure before more than a few percent of Uranium or MOX fuel is utilized. Recently, great interest has revived regarding Thorium molten salt reactors which are capable of potentially generating large amounts of power with very little generation of nuclear waste; Thorium reactors were first investigated by Dr Alvin Weinberg at Oak Ridge National Laboratories in the 1950's and 1960's. Beneficially, a Thorium molten salt reactor can be configured to transmute contemporary stockpiles of nuclear waste and render them relatively harmless. Moreover, Thorium is a relatively plentiful material derived from Monozite ore, wherein circa 1 million tonnes or Monozite ore is to be found in the Telemark region of Norway. Systems pursuant to the present invention including the converters 10 are ideal for supporting Thorium molten salt reactor apparatus, wherein floating offshore Thorium reactor apparatus are well protected from tsunamis and also have copious cooling water readily available. As Japan now has huge stockpiles of nuclear waste, such Thorium reactor apparatus can synergistically provide Japan with copious amounts of power in a safe manner whilst also transmuting and thus safely disposing of Japan's stockpiles of nuclear waste. When Thorium molten salt reactors are provided with safety melt-plug arrangements, thermal runaway incidents such as occurred at Fukushima would be virtually impossible with such Thorium molten salt reactors. The Thorium salt configurations employed are beneficially Fluoride-based or Chloride-based. The converters 10 are beneficially employed to absorb incoming waves and thus protect such Thorium reactor apparatus from danger. In an event of a massive freak wave, for example a tsunami, platforms including converters 10 pursuant to the present invention would ride on a top of such massive waves and not sustain damage; moreover, the converters 10 employed beneficially synergistically contribute to power generation as well as performing an ocean wave energy absorbing function. Presently, Thorium molten slat reactors are being considered for submarines wherein no refuelling would be required during the lifetime of the submarines on account of the efficient consumption of Thorium fuel within such reactors. Floating power stations based on aforesaid Thorium reactor apparatus and converters 10 for ocean wave energy absorption purposes can be deployed along coastlines as required, for example for emergency desalination of sea water to generate fresh water for famine-stricken areas. Contemporary companies such as Flibe Inc. (USA) and Rolls Royce (GB) are now believed to be working on rapid development programmes for Thorium molten salt reactors. Known Thorium reserves are estimated to be able to power the World at existing energy consumption rates presently derived from burning fossil fuels for a period in excess of 100000 years, given that suitable development of commercial designs of Thorium molten salt reactors can be executed.

The aforesaid converter 10 is susceptible to being employed in diverse applications to provide protection against ocean waves and/or to generate energy from ocean waves. Rows and arrays of the converter 10 can be used, for example, to provide coastal defences against waves, wave protection along floating bridges, wave protection around offshore aquaculture facilities, harbours, floating islands, buoys, and such like.

The converter 10, in its various implementations as described in the foregoing, beneficially employs nanotechnology to enhance its performance. Beneficially, inside surfaces of the columns 20 and the port arrangement 30 are coated with a layer of nano-particle material which hinders growth of algae and similar aquatic biota. Moreover, where concrete material is employed when implementing the converter 10, or systems incorporating the converter 10, the concrete material is beneficially of close-pore type which is capable of withstanding decades of use in marine environments without substantially degradation. Moreover, the concrete material itself is beneficially strengthened by incorporation of nano-fibres therein, for example Carbon tubules which exhibit a strength-to-weight performance many orders of magnitude greater than high-tensile steel.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A wave energy converter for converting in operation energy conveyed in ocean waves propagating in a wave propagation direction in an ocean environment and received at the converter into generated power, comprising:
   a plurality of columns which are in fluidic communication via corresponding ports to the ocean waves received at the converter, wherein the ports are arranged substantially in series along the wave propagation direction, and wherein the ports are of progressively greater depth into the ocean environment along the wave propagation direction so as to cause a first component of the ocean waves to propagate in a downward direction and a second component of the ocean waves to propagate into the ports to couple energy thereto, and
   the plurality of columns are arranged with elongate axes substantially aligned along a first direction, and such that the ports have corresponding port angles relative to the first direction which are progressively larger or smaller as the ports are of progressively greater depth.

2. The wave energy converter as set forth in claim 1, wherein the first direction is a substantially vertical direction when the converter is in operation.

3. The wave energy converter as set forth in claim 1, wherein the ports have an elliptical, round or rectilinear cross-section.

4. The wave energy converter as set forth in claim 1, wherein the plurality of columns are operable to couple to the ocean waves received at the ports in a resonant manner.

5. The wave energy converter as set forth in claim 1, wherein the columns include corresponding energy pickoff devices at upper regions thereof, at lower regions thereof, in ports thereof or at combinations thereof.

6. The wave energy converter as set forth in claim 1, wherein the converter includes between 2 and 10 columns and associated ports arranged in series.

7. The wave energy converter as set forth in claim 1, wherein the converter includes one or more submerged wave reflectors in a vicinity of the ports of the converter for reflecting the ocean waves more efficiently into the ports.

8. A method of converting energy conveyed in ocean waves propagating in a wave propagation direction in an ocean environment when received at a wave energy converter to generate power, comprising:

(a) arranging for the converter to include a plurality of columns which are in fluidic communication via corresponding ports to the ocean waves received at the converter;

(b) arranging for the ports to be substantially in series along the wave propagation direction; and (c) arranging for the ports to be of progressively greater depth into the ocean environment along the wave propagation direction so as to cause a first component of the ocean waves to propagate in a downward direction and a second component of the ocean waves to propagate into the ports to coupled energy thereto, wherein said method includes arranging the plurality of columns are arranged with elongate axes substantially aligned along a first direction, and such that the ports have corresponding port angles relative to the first direction which are progressively larger or smaller as the ports are of progressively greater depth.

* * * * *